United States Patent
Beck et al.

[11] Patent Number: 5,908,989
[45] Date of Patent: Jun. 1, 1999

[54] METHOD AND APPARATUSES FOR MEASURING AND CORRECTING THE STRESS PROFILE OF SAW BLADES

[75] Inventors: Ernst Beck, Maselheim; Norbert Bailer; Peter Bailer, both of Schemmerhofen; Peter Lenard, Biberach, all of Germany

[73] Assignee: Vollmer Werke Maschinenfabrik GmbH, Riss, Germany

[21] Appl. No.: 08/945,656

[22] PCT Filed: May 15, 1996

[86] PCT No.: PCT/EP96/02096

§ 371 Date: Nov. 5, 1997

§ 102(e) Date: Nov. 5, 1997

[87] PCT Pub. No.: WO96/36453

PCT Pub. Date: Nov. 21, 1996

[30] Foreign Application Priority Data

May 16, 1995 [DE] Germany ............... 195 17 986

[51] Int. Cl.$^6$ ........................................ G01N 3/08
[52] U.S. Cl. ................................. 73/829; 73/828
[58] Field of Search ..................... 73/787, 788, 794, 73/826, 828, 829

[56] References Cited

U.S. PATENT DOCUMENTS

| | | | |
|---|---|---|---|
| 3,916,680 | 11/1975 | Allen et al. | 73/772 |
| 3,919,900 | 11/1975 | Allen et al. | 73/794 |
| 4,085,630 | 4/1978 | Williams . | |
| 4,107,983 | 8/1978 | Dawson | 73/794 |
| 4,498,345 | 2/1985 | Dyer et al. | 73/862.454 |
| 4,852,430 | 8/1989 | Opplinger et al. . | |
| 4,922,762 | 5/1990 | Loring | 73/862.473 |
| 5,642,159 | 6/1997 | Oba | 73/104 |

*Primary Examiner*—Max H. Noori
*Attorney, Agent, or Firm*—Clifford W. Browning; Woodard, Emhardt, Naughton, Moriarty & McNett

[57] ABSTRACT

A saw blade (10), in particular for band saws, is moved through a measuring path and a rolling path in a direction of travel (A) which essentially corresponds to its longitudinal direction, with two marginal regions of the saw blade (10) being supported on the measuring path-and held down in a start portion and an end portion of same and thus being held in a common reference plane which contains the direction of travel (A) and the saw blade (10) being lifted above the reference plane by a supporting force which is exerted only in the central area of the measuring path. The profile of the saw blade (10) is then measured in a measuring plane (B) which extends orthogonally to its direction of travel (A) in the center area of the measuring path, with data of the profile height relative to a chord which extends transversely to the direction of travel (A), coordinated with data of the distance of the measuring points from an edge (14) of the saw blade (10) and data of the longitudinal movement of the saw blade is stored. The saw blade (10) will be rolled in the direction of travel (A) region-by-region in accordance with this data.

10 Claims, 12 Drawing Sheets

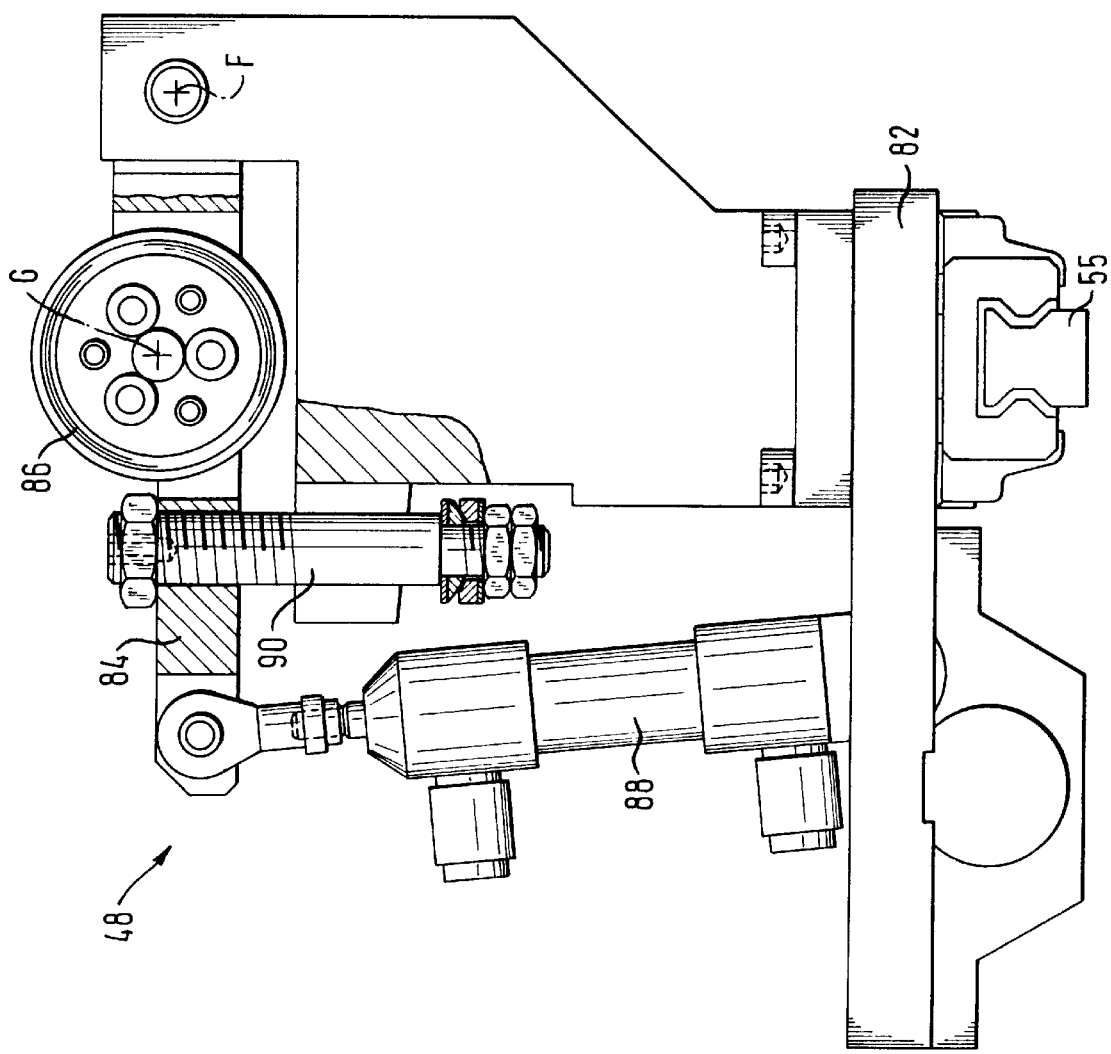

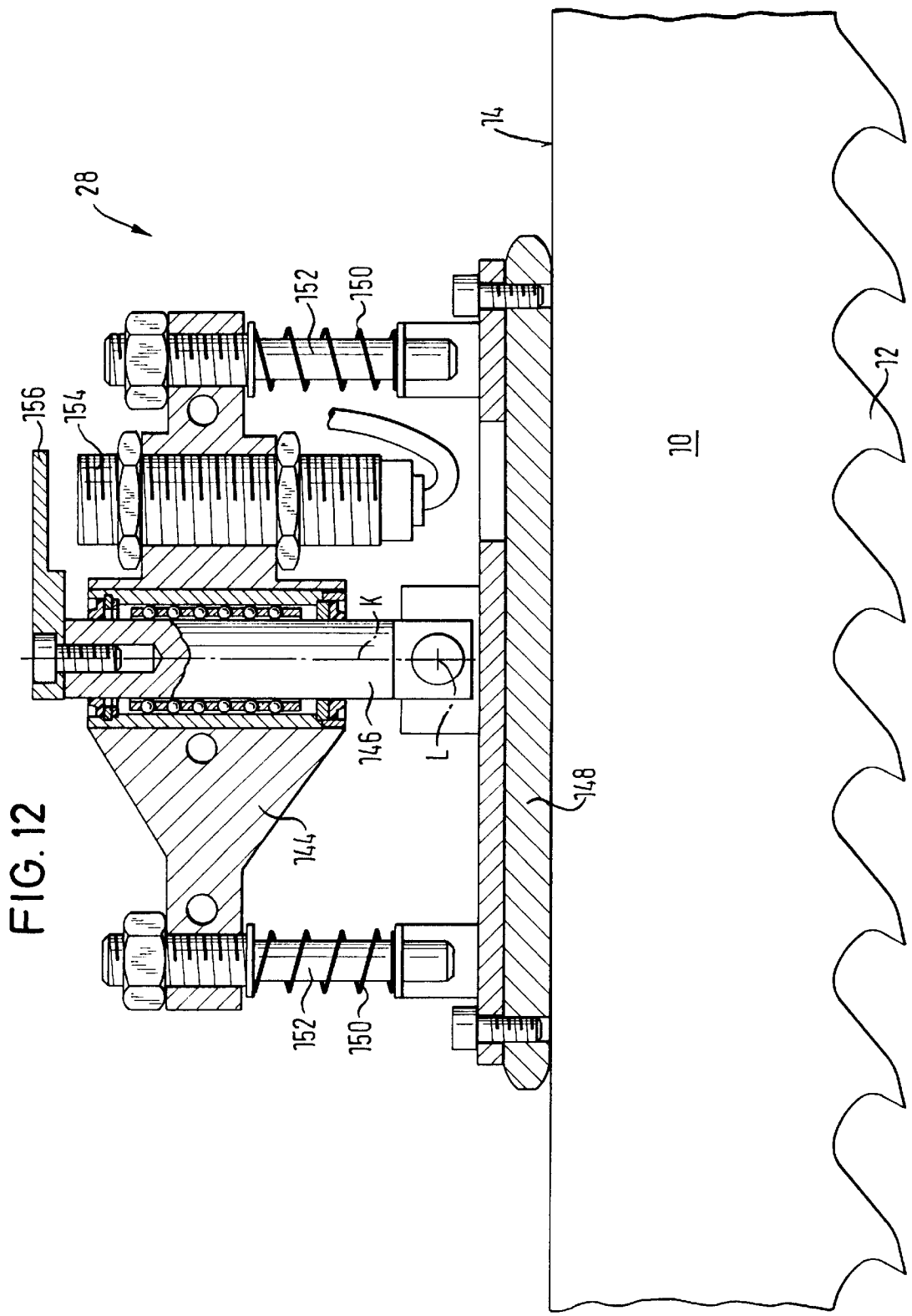

METHOD AND APPARATUSES FOR MEASURING AND CORRECTING THE STRESS PROFILE OF SAW BLADES

The invention relates to a method for measuring and correcting the stress profile of an elongated saw blade, in particular for band saws, wherein the saw blade is moved through a measuring path and a rolling path in a direction of travel which essentially corresponds to its longitudinal direction;

two marginal regions of the saw blade are supported on the measuring path and held down in a start portion and an end portion of same;

the profile of the saw blade is measured in the central area of the measuring path in a measuring plane which is orthogonal to its direction of travel;

data of the profile height relative to a chord which extends transversely to the direction of travel, coordinated with data of the distance of the measuring points from an edge of the saw blade and data of the longitudinal movement of the saw blade is stored; and the saw blade is rolled in the rolling path in a region-by-region manner in the direction of travel in accordance with this data.

The invention further relates to an apparatus for carrying out such a method, comprising a machine table on which an elongated saw blade, in particular for a band saw, is movable in a direction which essentially corresponds to its longitudinal direction;

a measuring station arranged at the machine table, comprising a measuring plane which extends orthogonally to the direction of travel and in which at least one sensor is arranged;

one pair of parallel blade supports for one edge region each of the saw blade; and two pairs of holding-down devices which are arranged in a start and an end zone, respectively, of the measuring station for pressing the saw blade onto the blade supports symmetrically to the measuring plane.

A method and an apparatus of this generic type are known from AT-B-342 385(equivalent of U.S. Pat. No. 3,919,900 to Allen et al.) There, an endless saw blade for a band saw runs over two deflection rollers which are supported in a machine frame so as to be rotatable about a horizontal axis each and limit an area of the machine frame in between which in the following—and also with reference to the present invention—will be designated as the machine table. On the machine table, several stations are arranged in series in the direction of travel of the saw blade which are required for measuring and correcting the stress profile and the curvature of the saw blade back, i.e. a measuring station for sensing the blade back, a measuring station for sensing the stress profile and a rolling station for correcting the stress profile and the curvature of the back of the saw blade.

Here and in the following the term blade back of a single-sided toothed saw blade refers to the edge opposite the toothed edge. This, however, is not be be construed as excluding saw blades with teeth on both sides for band saws and gate saws—also in the context of the present invention; in the case of such saw blades one of the two toothed edges is sensed instead of a smooth edge in order to determine whether and how the saw blade is curved in its plane and whether it deviates from its intended direction of travel.

The measuring station for sensing the blade back of the mentioned known apparatus comprises two skid-type guides which, relative to the direction of travel of the saw blade, are arranged at a distance one behind the other and define a vertical contact plane for the blade back. A sensor is arranged between these two guides which senses the blade back in the plane of the saw blade orthogonally to its direction of travel. On the basis of the data determined in this manner, the radius of curvature can be calculated for any position of the blade back.

Relative to the direction of travel of the saw blade, the measuring station for sensing the stress profile is arranged at a distance behind the measuring station for sensing the blade back, and comprises two formed plates with arc-shaped upper edges which are arranged parallel to the direction of travel of the saw blade in one vertical plane each and support same in one marginal region each, so that they define a measuring path. In a start area and an end area of this measuring path, one pair of poles each is fastened at the machine frame, and a holding-down arm is hinged at the upper end of each pole for pivoting in a vertical longitudinal plane, at the bottom end of which a holding-down roller is supported. The total of four holding-down rollers press the saw blade against the two formed plates in the start and end area of the measuring path. Magnets are arranged along the upper edges of the formed plates, which prevent the saw blade from developing bulges instead of moulding itself in the intended manner to arc-shaped upper edges of the formed plates and to slide along them. The saw blade in this measuring path is thus forced to adopt a curvature which is established by the formed plates which can only be changed by replacing the formed plates by differently formed ones. In a vertical central plane of the measuring path, a sensor is arranged so as to transversely move the saw blade to and fro in order to measure its stress profile.

The reasons for the occurrence of the stress profile and the principles of correcting same by rolling are known; in this context, reference is made for example to DE-A-42 14 784 in addition to AT-B-342 385 mentioned above.

According to AT-B-342 385 the saw blade eventually travels through a rolling station which is also arranged on the machine table and which comprises a roll pair which can be adjusted transversely to the saw blade and subjected to a hydraulic pressure in order to deformingly act upon selectable regions of the saw blade and thus correct its stress profile. The apparatus known from DE-A-42 14 744 also comprises a machine table which is arranged between two deflection rollers over which a saw blade travels on which several measuring paths are arranged one behind, the other in the direction of travel of the saw blade, i.e. a measuring path for the stress profile, a travel measuring path and measuring path for bulges and dents. The measuring path for the stress profile is arranged in an area in which the saw blade is curved as a result of its deflection My one of the deflection rollers so that it reveals its stress profile automatically without having to be lifted first. Downstream of the latter measuring path, the measuring path for bulges and dents, a processing unit is arranged which comprises several roll pairs, i.e. one for leveling out bulges, one for leveling out dents and one for correcting the stress profile of the saw blade.

The invention is based on the object (if simplifying measuring and correcting the stress profile of an elongated saw blade and, if required, of simplifying the elimination of bulges and dents, which is briefly referred to as leveling, under process and apparatus engineering aspects.

According to the invention, the object is solved by a method of the initially mentioned generic type in that the marginal regions of the saw blade are retained in the start area and the end area of the measuring path in a common reference plane which includes the direction of travel;

the saw blade is lifted above the reference plane by a supporting force which is exerted only in the central area of the measuring path; and the stress profile developed in this manner is measured.

As far as it concerns an apparatus, the mentioned object is solved according to the invention and based on an apparatus of the initially mentioned generic type in that the pairs of holding-down devices, remaining disposed symmetrically with the measuring plane, are adjustable in and opposite, respectively, to the direction of travel of the saw blade so as to approach each other or to retreat from each other.

This enables saw blades of widely different widths and thicknesses to be measured in brief succession and their stress profile to be corrected without necessitating time-consuming retrofitting operations.

The conversion to saw blades with different widths and thicknesses, i.e. also with a different rigidity, is particularly facilitated when the supporting force is exerted in the measuring plane only and there preferably only at a distance from the two marginal regions in such a region where the maximum profile height is to be expected. The adaptation to saw blades of different rigidity is further preferably facilitated in that the holding-down forces are exerted on the marginal regions of the saw blade only at variable identical distances corresponding to the width and thickness of the saw blade upstream and downstream the measuring plane. The design means for achieving this adaptability are of an extremely simple design and can be handled easily.

Saw blades of different widths and thicknesses often have very different tendencies to deviate from the intended route of travel depending of the stresses to which they are subjected during operation. In this respect, too, the described known method is hard to carry out with certain saw blades and it is not easy to operate the associated apparatus. In order to simplify the measurement and correction of the stress profile of an elongated saw blade, which may be a saw blade of a band saw or a gate saw, in this respect, too, deviations from a given position which are determined on one edge of the saw blade are corrected according to the invention by rolling the saw blade in accordance with these deviations in a direction more or less slanted relative to its longitudinal direction. This is done by means of a roll pair which according to the invention can be adjusted so as to be slanted in accordance with the measuring data of at least one measuring station which senses the edge of the saw blade.

In the following, an embodiment of the invention will be described in more detail with reference to the drawings, in which:

FIG. 11 is an enlarged section from FIG. 5;

FIG. 12 shows an assembly from FIG. 6 in an enlarged horizontal section;

Figure 14:
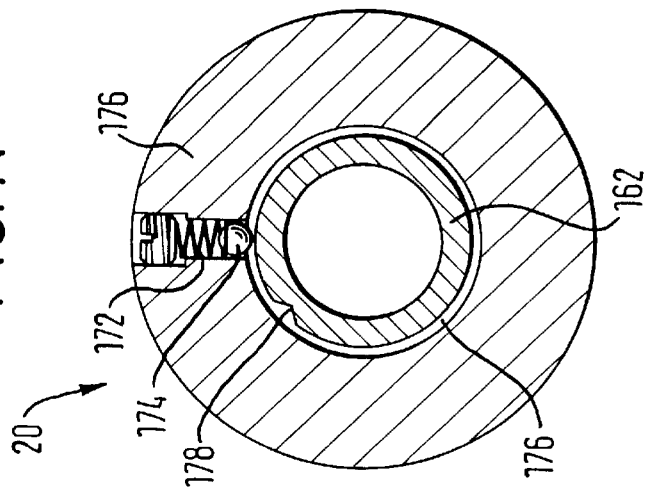
FIG. 14 shows the section XIV—XIV in FIG. 13.

The illustrated machine serves to automatically level saw blades 10. The illustration shows a band saw blade which has teeth 12 along a longitudinal side and a smooth blade back 14 at the opposite longitudinal side; it is, however, possible to process band saw blades with two-sided toothing as well as gate saw blades. The machine has an elongated machine table 16, at the two face ends of which one frame 18 each is installed as an extension. At the frames 18, horizontal guide rolls 20 are supported parallel to each other at an adjustable distance from the machine table 16. The saw blade 10 travels in the direction of arrow A in FIGS. 1 to 3 over the guide rolls 20 at the left frame 18 and subsequently through several stations arranged on the machine table 16, i.e. a measuring station 22 which senses the surface of the saw blade 10 in a vertical direction, a leveling station 24 for leveling bulges and dents in the saw blade 10, a rolling station 26 for driving the saw blade 10 and providing it with a desired stress profile, at least one measuring station 28 which senses the blade back 14 in a horizontal direction transverse to its direction of travel, and via further guide rolls 20 at the machine table 16 and the right frame 18. The saw blade 10 can also be moved in the opposite direction of the arrow A. In the illustrated example three measuring stations 28 for sensing the blade back 14 are arranged over the entire length of the machine table 16. Said stations and guide rolls 20 are shown in more detail in FIGS. 7 to 12 or in FIGS. 13 and 14, respectively, and will be described in the following.

Columns 30 are associated with the measuring station 22 and are fastened to the machine table 16, at the left-hand side of which (FIG. 9) a stationary, horizontal rear blade support 32 in the form of a longitudinal hardened and ground steel strip is arranged. A longitudinal guide 34 is fastened parallel to it at the rear side of the column 30, at which two rear holding-down devices 36 are arranged so as to be adjustable symmetrically to a vertical plane which extends transversely to the longitudinal direction of the machine table 16 and which will be referred to in the following as measuring plane B. In addition, two transverse guides 38 are fastened on the machine table 16, in which one cross slide 40 each is adjustably guided. The two cross slides 40 carry a front horizontal blade support 42 which also extends in the longitudinal direction of the machine, i.e. parallel to the rear blade support 32, and which is also formed by a strip from hardened and ground steel. The surfaces of the two blade supports 32 and 42 lie in a common horizontal plane so that the saw blade, as long as it rests upon them, is held horizontally. A front longitudinal guide 44 is also fastened to both cross slides 40, at which two front holding-down devices 46 are adjustably arranged symmetrically to the measuring plane B.

A supporting means 48 (FIGS. 6 and 9) is also associated with the measuring station 22, the purpose of which is to support the saw blade 10 in the measuring plane B in the area between the two blade supports 32 and 42 and at approximately the same distance from the rear blade support 32 as from the front blade support 42 in approximately one single point, as will be described below in more detail. The two cross slides 40 are adjustable along the transverse guides 38 by means of a screw spindle 50 (FIG. 6) which is supported in parallel thereto on the machine table 16 in an axially stationary manner. The screw spindle 50 can be rotated by means of a handwheel 52 (FIGS. 3, 5 and 9) and is coupled with a reduction ratio of 2:1 to a similar screw spindle 54 which extends parallel to it and meshes with the supporting means 48. Rotating the handwheel 52 makes it possible to adjust the distance of the transversely adjustable front blade support 42 and the holding-down devices 46 from the stationary rear blade support 32 together with the associated holding-down devices 36 to the width of the saw blade to be processed; at the same time, the supporting means 48 is adjusted along another horizontal transverse guide 55 (FIGS. 5 and 6) in such a manner that its distance ratios with respect to the two blade supports 32 and 42 remain constant.

Figure 1:
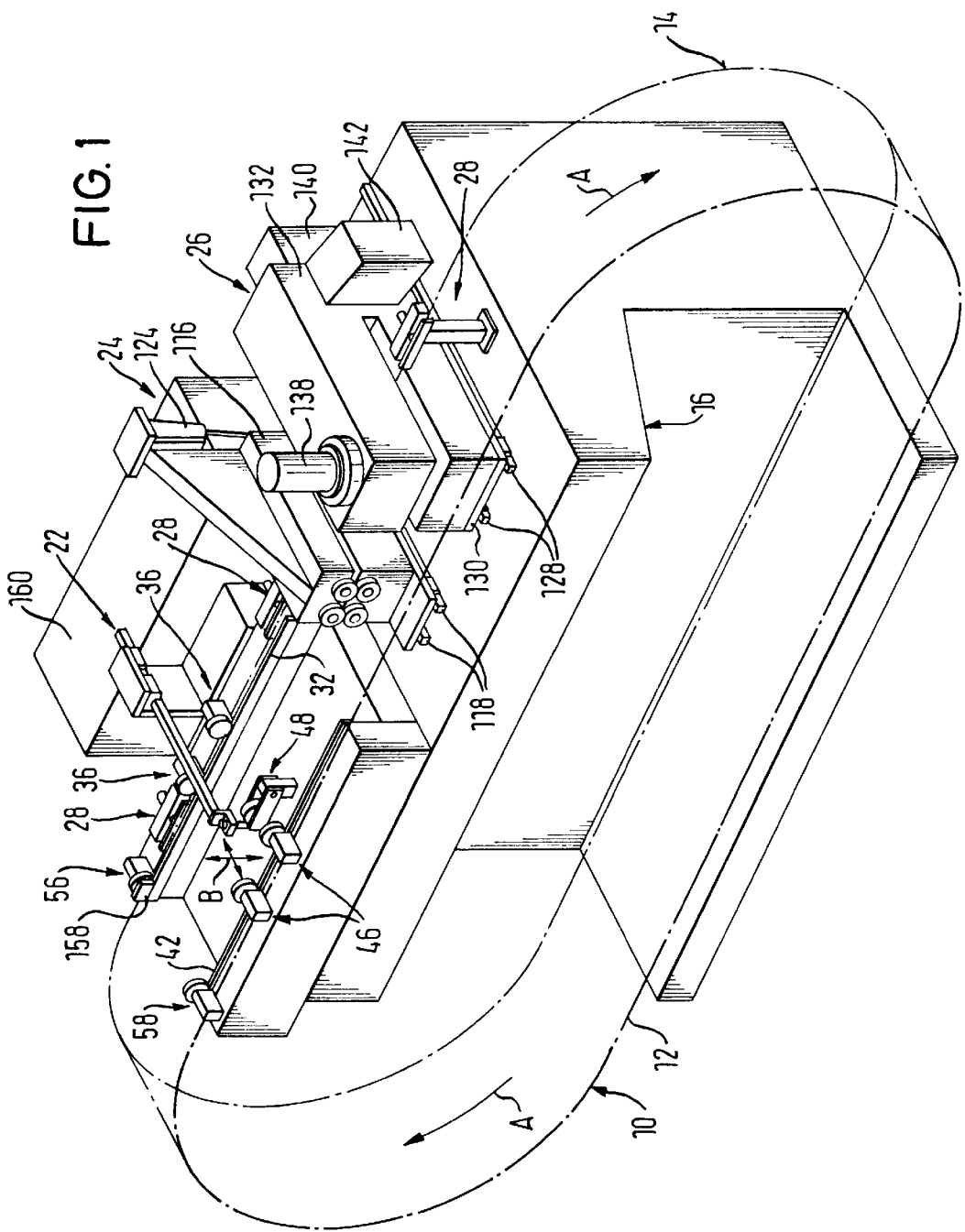
FIG. 1 is an isometric view of the major portion of a machine according to the invention for leveling saw blades.
Figure 2:
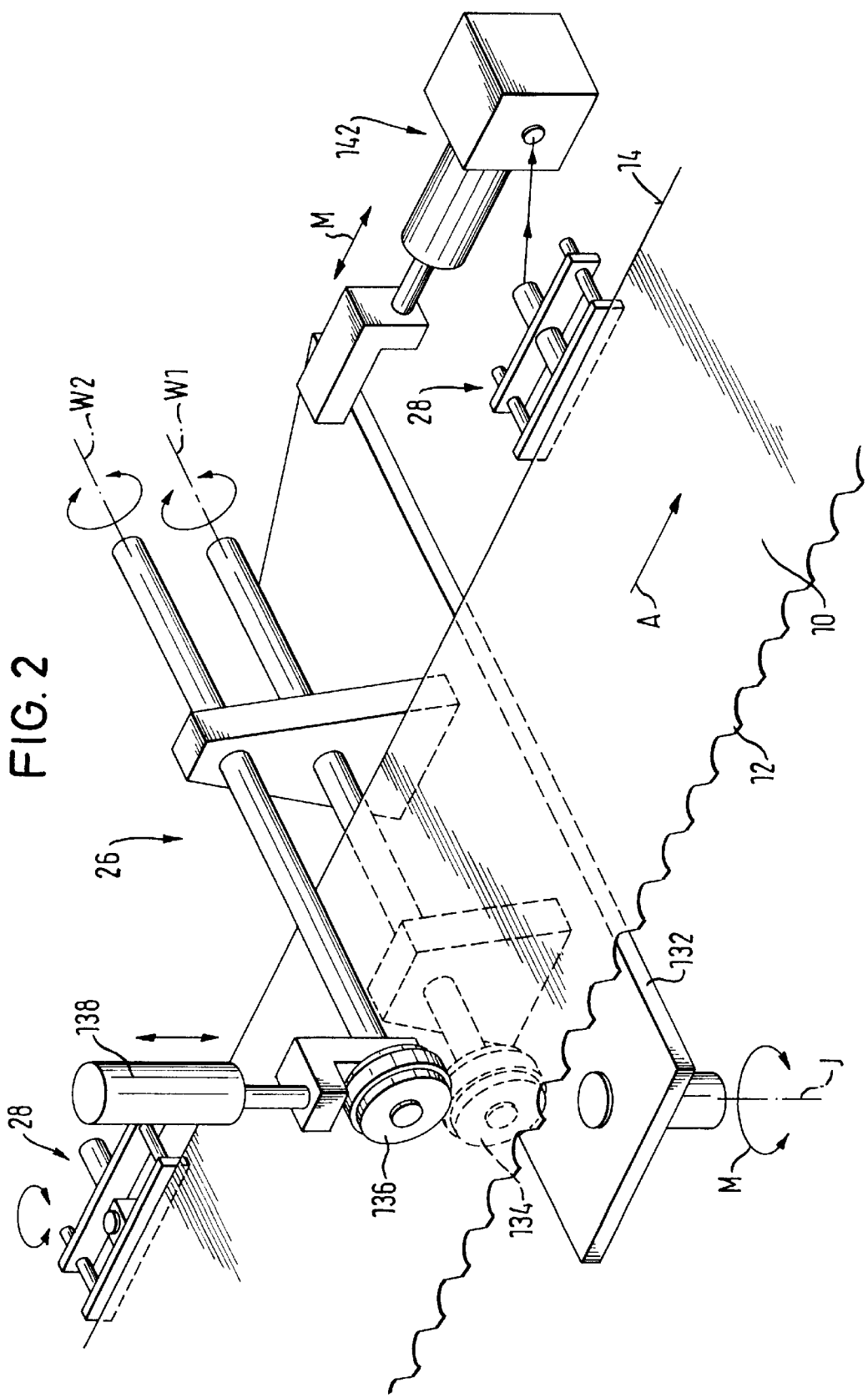
FIG. 2 shows an enlarged still more schematic section from FIG. 1.
Figure 3:
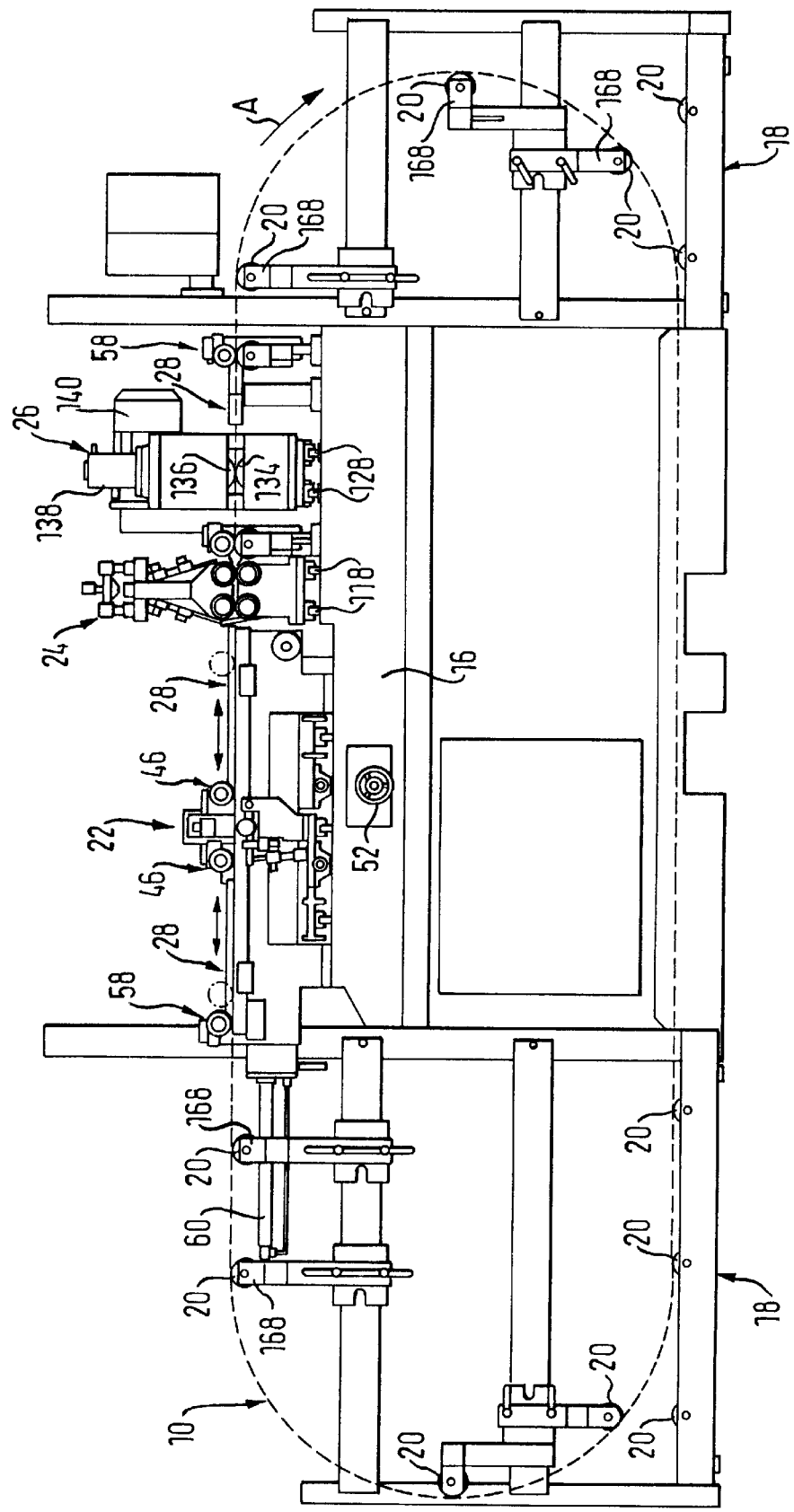
FIG. 3 is the front view of the entire machine.
Figure 4:
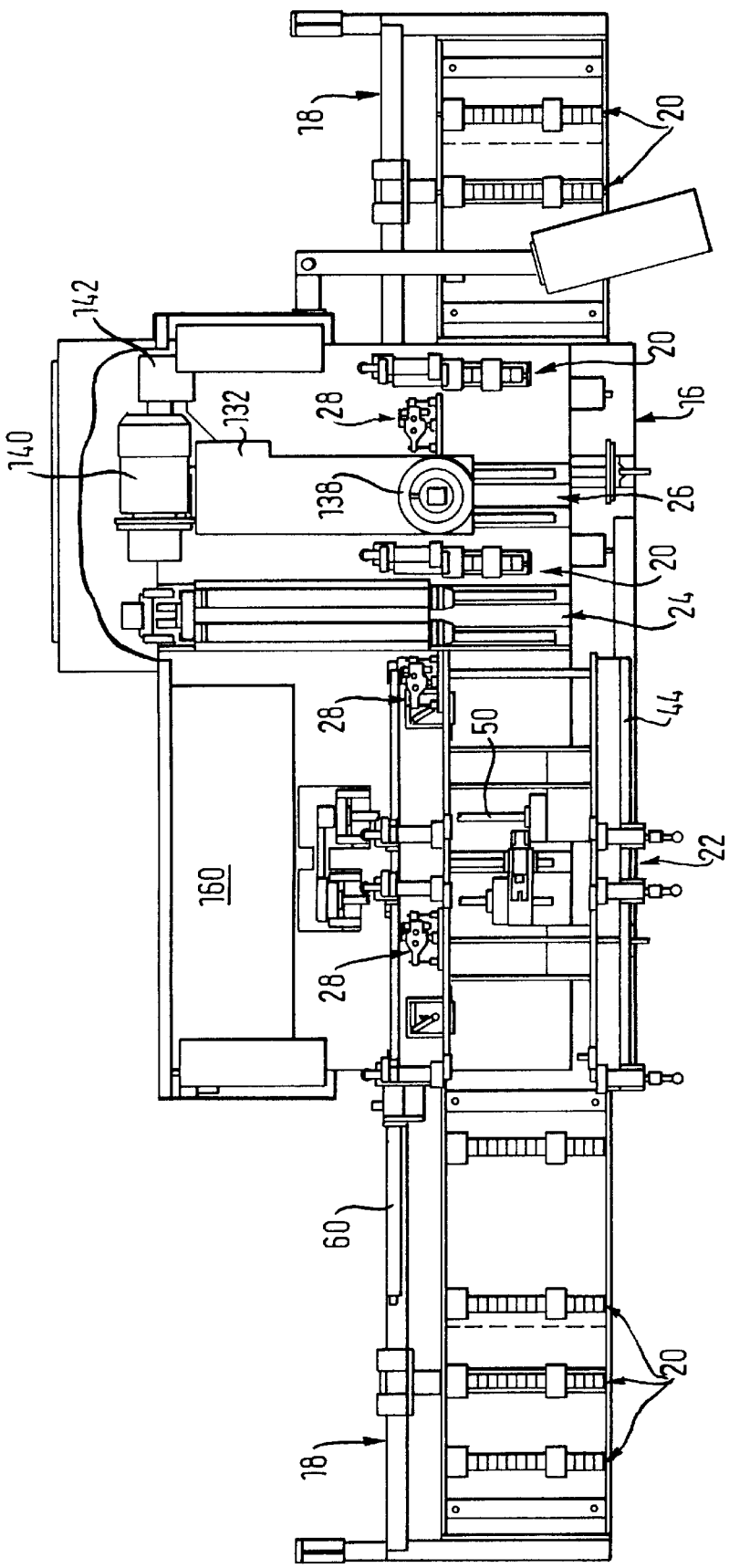
FIG. 4 is the plan view associated with FIG. 3.
Figure 5:
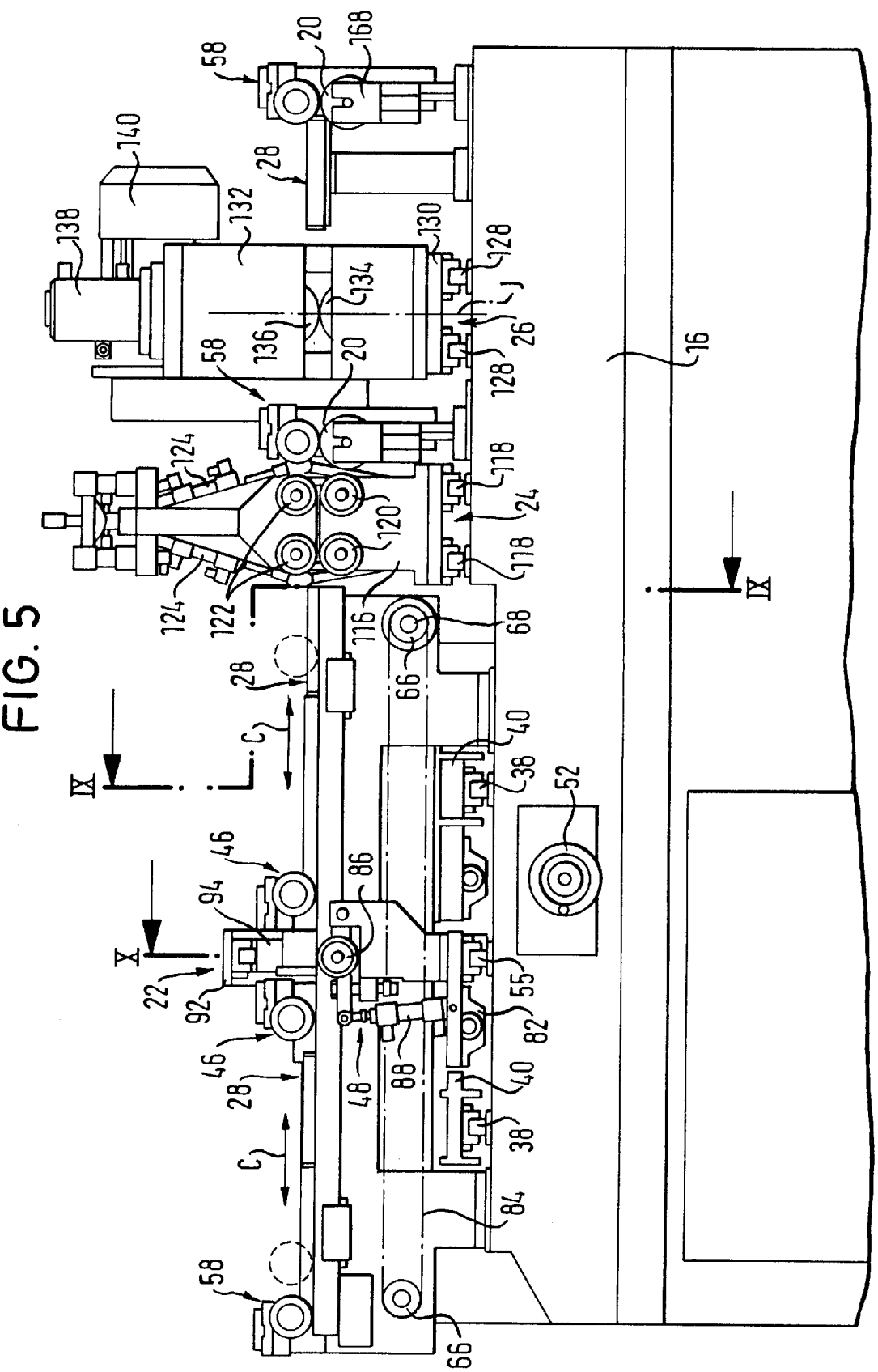
FIG. 5 is the front view of the main portion of the machine drawn to a larger scale.
Figure 6:
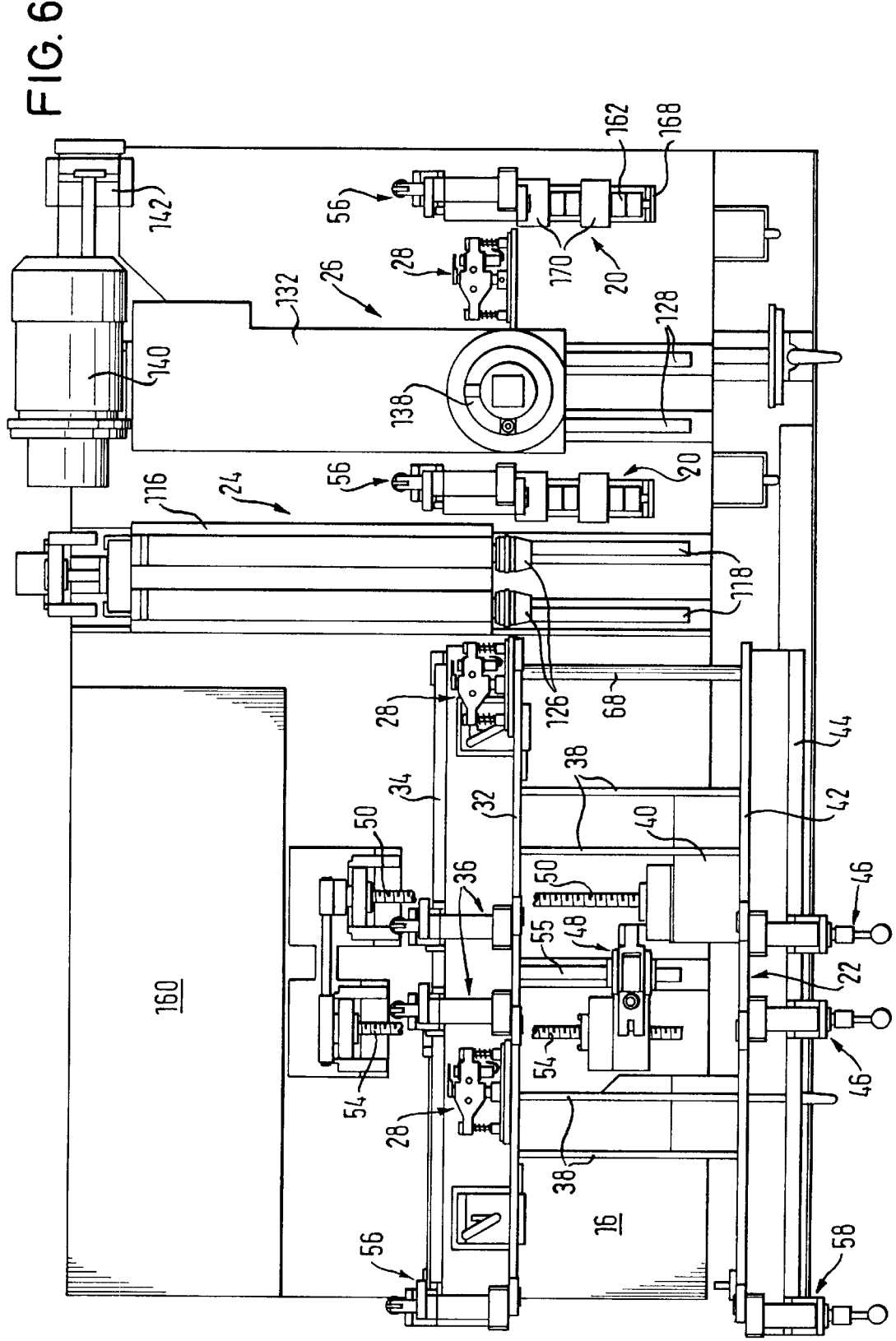
FIG. 6 is the plan view associated with FIG. 5.

At the left end of the machine table 16 (FIGS. 1 to 6) a stationary holding-down device 56 is arranged at the rear side facing away from a viewer of FIGS. 1, 3 and 5, and a holding-down device 58 is arranged at the front which is connected with the two cross slides 40 for a common transverse movement, i.e. which is also adjustable corresponding to the width of the saw blade 10.

The holding-down devices 36 and 46 which are arranged symmetrically with the measuring plane B are shown in the drawings in a position where they have the smallest possible distance from the measuring plane B. This position serves to measure particularly narrow and thin saw blades 10. From the illustrated position, the two rear holding-down devices 36 and similarly the two front holding-down devices 46 can be adjusted so as to retreat from one another in the direction of the double arrows C in FIG. 5, with their arrangement remaining symmetric to the measuring plane B. The circles shown in broken lines in FIG. 5 indicate the positions in which the holding-down devices 36 and 46 assume their largest possible distance from the measuring plane B. This position is intended for measuring particularly wide and thick saw blades.

Figure 7:
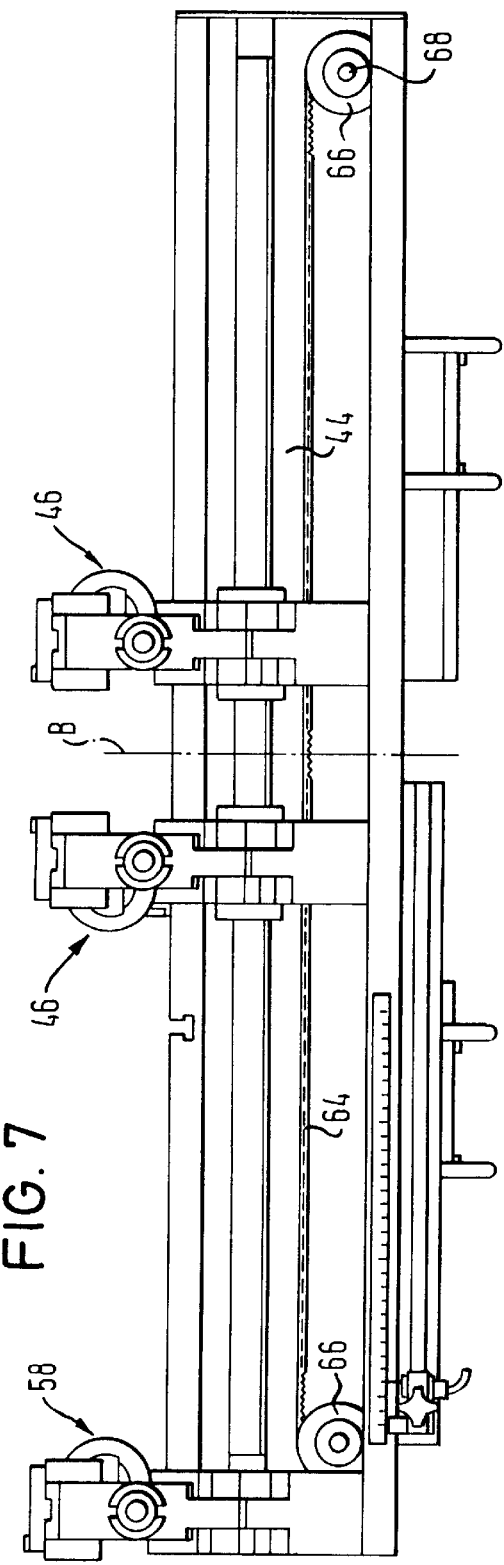
FIG. 7 is a further enlarged front view of an assembly from FIG. 5.
Figure 8:
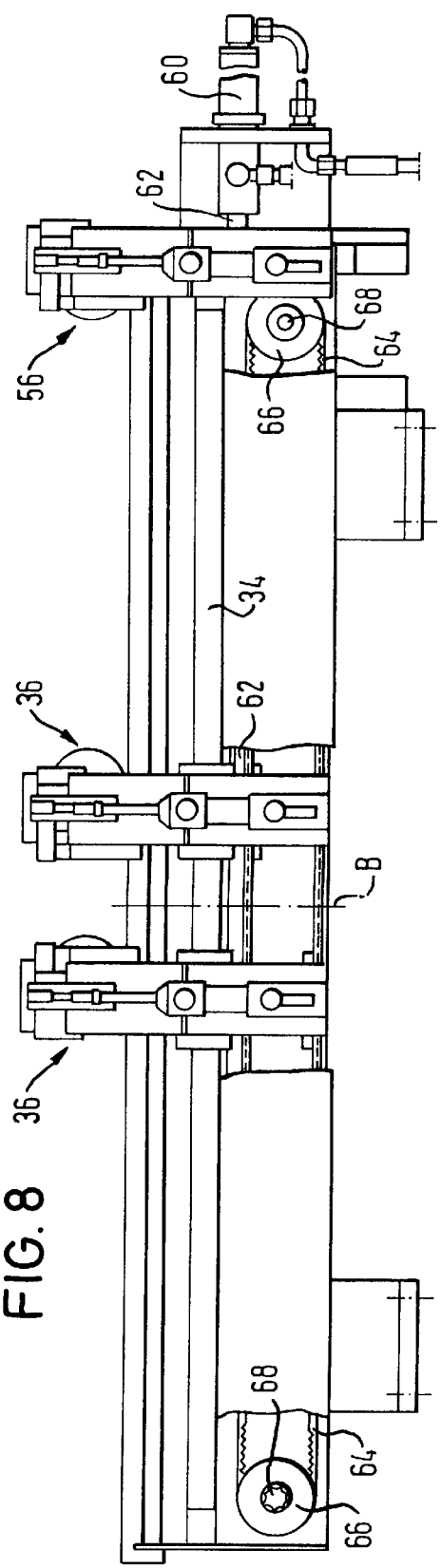
FIG. 8 is a rear view corresponding to FIG. 7.
Figure 9:
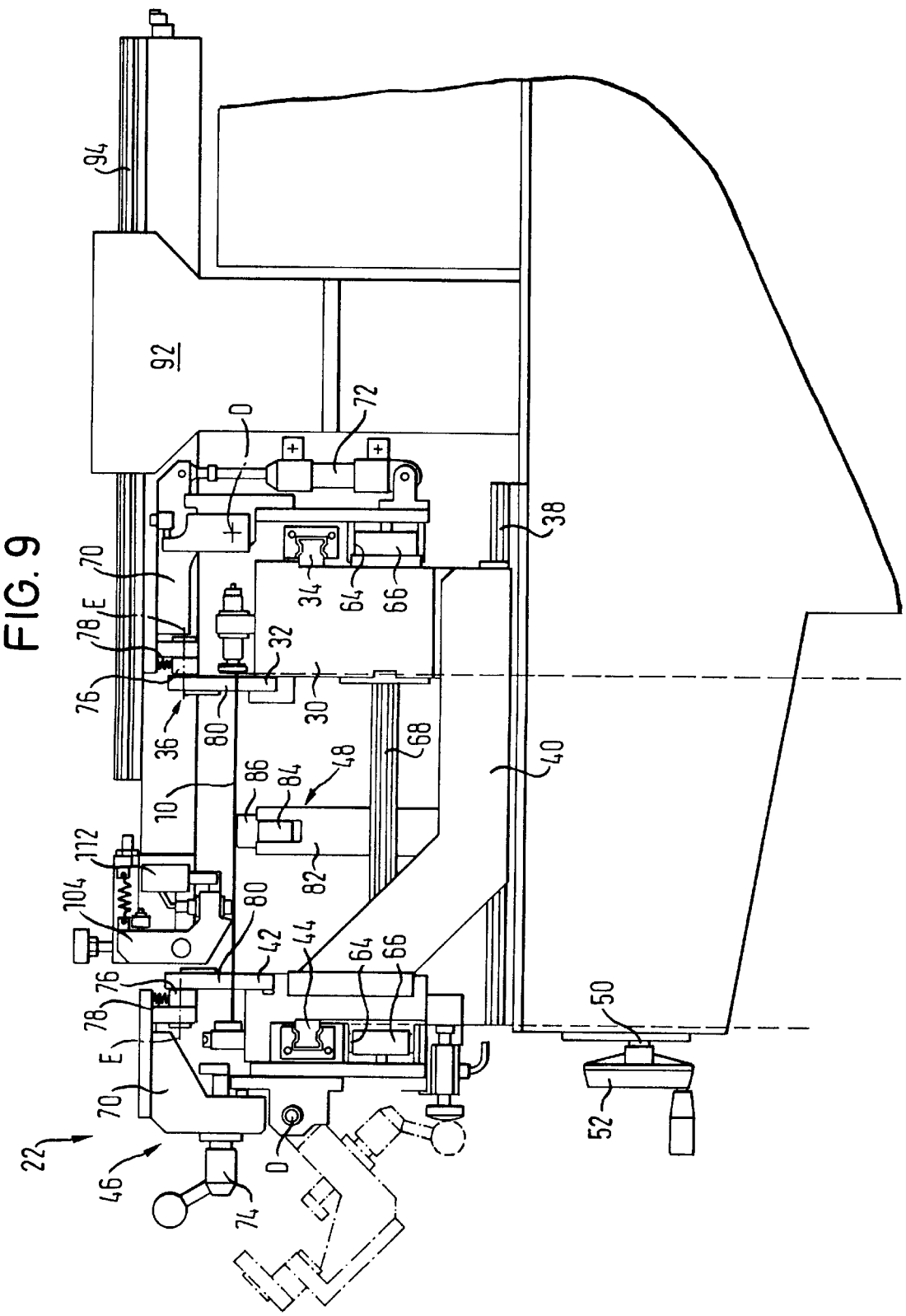
FIG. 9 is a further enlarged longitudinal view in the direction of arrows IX—IX in FIG. 5.
Figure 10:
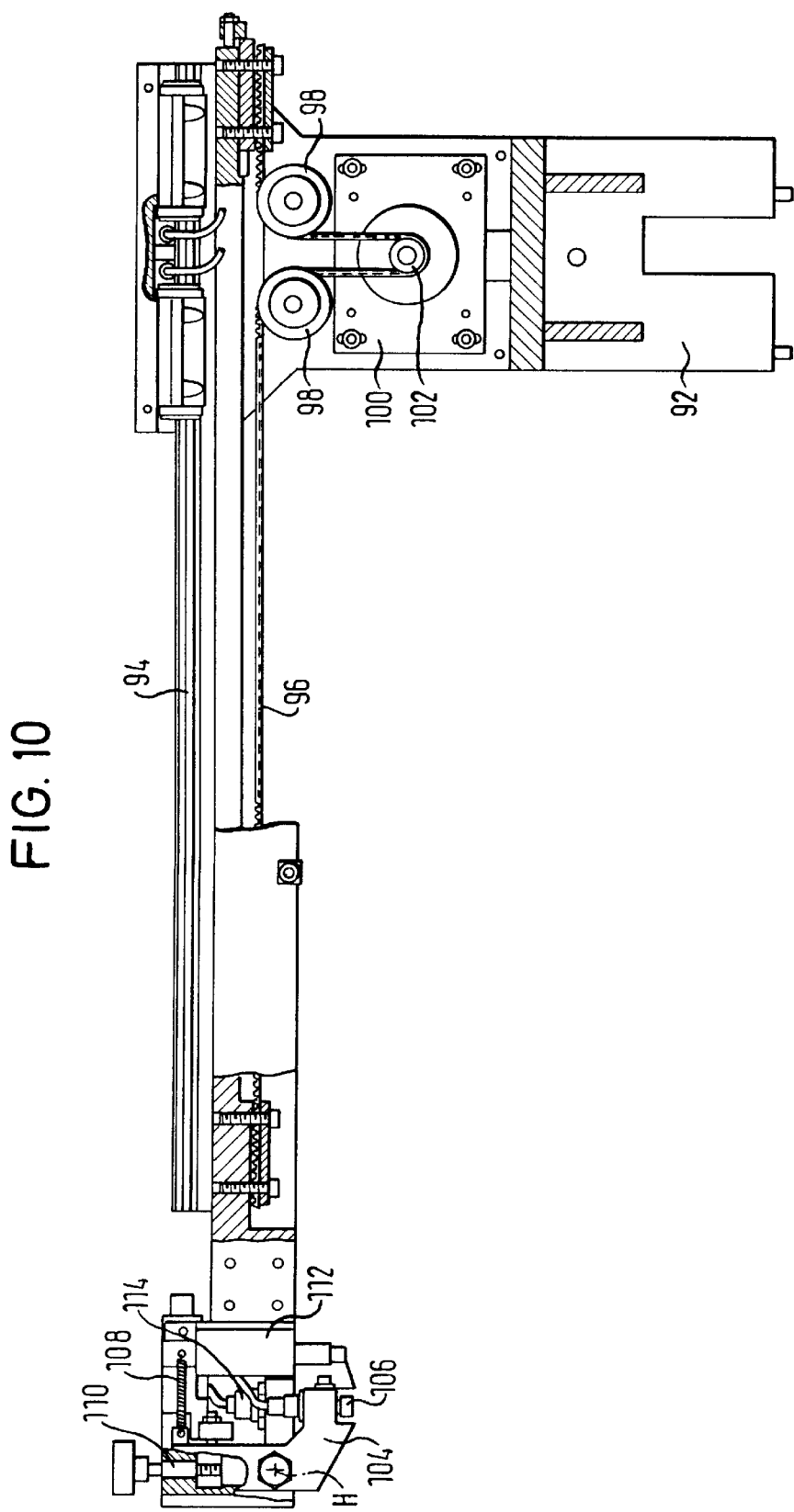
FIG. 10 shows an enlarged section in plane X of FIG. 5.

In order to adjust the holding-down devices 36 and 46 in the longitudinal direction of the machine table 16, a drive 60 (FIGS. 3, 4 and 8) is provided which in the illustrated example is a hydraulic piston/cylinder unit with a piston rod 62, the end of which being fastened to one of the two rear holding-down devices 36. In order to ensure that the rear holding-down devices 36 and correspondingly the front holding-down devices 46 are always moved symmetrically to the measuring plane B, at the front and rear side of the machine table 16 one toothed belt 64 each is guided in a vertical longitudinal plane over two deflection gears 66. The deflection gears 66 which are arranged at the front and rear side of the machine table 16 are in synchronism with each other by means of shafts 68 (FIGS. 7 to 9). One of the two rear holding-down devices 36 is rigidly connected with the upper half of the rear toothed belt 64, and the other is connected with the lower half of the rear toothed belt 64, and in a corresponding manner one of the two front holding-down devices 46 is connected with the upper half of the front toothed belt 64 and the other is connected with the lower half of the front toothed belt 64. The deflection gears 66 of the rear toothed belt are rigidly mounted on the shafts 68; the deflection gears 66 of the front toothed belt 64, however, are slidably guided axially on multiple splined profiles of the two shafts 68 so that the front toothed belt 64 can participate in transverse adjustments of the two front holding-down devices 46.

All holding down-devices 36, 46, 56 and 58 are of an essentially similar design. They have a pivot arm 70 (FIG. 9) each which can be swivelled about a horizontal longitudinal axis D. Each of the rear holding-down devices 36 and 56 is equipped with a hydraulic piston/cylinder unit 72 for swivelling its pivot arm 70. Each of the front holding-down devices 46 and 48 is provided with a locking handle 74 by means of which the associated pivot arm 70 can be manually swivelled between the opened position indicated by broken lines in FIG. 9 and the closed position indicated by solid lines and locked in the closed position. At the end of each pivot arm 70 a guide rod 76 is supported so as to be pivotable about a horizontal transverse axis E and is biased by a spring 78 in the sense of a downwardly directed swivelling motion towards the closed position. At the end of each guide rod 76 a holding-down roller 80 is supported so as to be rotatable about an axis which is parallel to the transverse axis E. The holding-down rollers 80 of all holding-down devices 36, 46, 56 and 58 are arranged vertically above the associated blade support 32 or 42, respectively. In the closed position the holding-down rollers 80 subject the saw blade 10 to the bias generated by the associated spring 78, which slidably rests on the blade supports 32 and 42 with an area adjacent to its teeth 12 or its blade back 14.

The supporting means 48 (FIGS. 9 and 11) incorporates a supporting slide 82 which is adjustable on the additional transverse guide 55 by means of the screw spindle 54 and which carries a supporting arm 84 (FIG. 11) which can be swivelled about a horizontal transverse axis F. At the supporting arm 84 a supporting roller 86 with a spherical surface is supported so as to be rotatable about a horizontal axis G which is parallel to the transverse axis F and thus also extends transversely. Instead of or in addition to its spherical shape the supporting roller 86 can be provided with an elastic coating. In each case, the edges of the supporting roller 86 must be prevented from impressing themselves into the saw blade 10. A lifting device 88 bears against the supporting slide 82, which in the illustrated example is a piston/cylinder unit, the piston rod of which being hinged at the end of the supporting arm 84. By advancing the lifting device 88 the supporting arm 84 can be swivelled upwards from its rest position shown in FIG. 11; this swivelling motion and thus the associated adjustment of the supporting roller 86 in an upward direction is limited by a stroke limiter 90 which in the illustrated example is formed by a screw bolt.

Also associated with the measuring station 22 is an upright 92 (FIGS. 9 and 10) which is fastened to the machine table 16 and on which a measuring slide 94 is guided so as to be horizontally adjustable in the measuring plane B. The two ends of a toothed belt 96 which runs via deflection rollers 98 and a pinion 102, which can be driven by a motor 100, e.g. a stepping motor, are fastened at the measuring slide 94. The measuring slide 94 has a front end which is arranged at the left side in FIGS. 9 and 10, at which an angle lever 104 is supported so as to be pivotable about a horizontal longitudinal axis H. The angle lever 104 carries a first sensor 106 and is biased by a spring 108 which has the tendency to hold it in contact with an adjustable stop 110, by means of which an operating position of the sensor 106 is defined. The sensor 106 can be swivelled from the operating position into a rest position by means of an electromagnet 112 which is hinged at the angle lever 104. In the vicinity of the front end of the measuring slide 94 an additional second sensor 114 is securely mounted. The first sensor 106 has, for example, a measuring range of 1.5 mm and is capable of measuring bulges and dents of the saw blade 10 with an accuracy of 0.01 mm. The second sensor 114 has a measuring range which is larger by about one power of ten and serves to sense the stress profile of the saw blade 10.

The levelling station 24 per se is of known design and is therefore not shown in detail. It comprises a roll frame 116 which in a side view is C-shaped (FIGS. 1, 5 and 6) and which is adjustable on transverse guides 118 fastened on the machine table 16. The roll frame 116 supports two lower stationary rolls 120 and two upper rolls 122 which are adjustably supported by one eccentric arrangement each. By adjusting the upper rolls 122 by means of one actuator 124 each, e.g. by one hydraulic piston/cylinder unit each, a rolling pressure can be applied to the saw blade 10 which is supported from below by the lower rolls 120. The axes of rotation of all rolls 120 and 122 extend horizontally and transversely to the longitudinal direction of the machine table 16; the rolls 120 and 122 are freely rotatable and have one conical shoulder 126 each to facilitate the introduction of the saw blade 10 transversely to the machine table 16 from the front to the rear between the rolls 120 and 122.

Another pair of transverse guides 128 is fastened on the machine table 16, on which a substructure 130 of the rolling station 26 is adjustably guided. On the substructure 130 a roll frame 132 which is also C-shaped when viewed from the side (FIG. 1, 2, 5 and 6) is supported so as to be pivotable about a vertical axis J. In the roll frame 132 a lower roll 134 and an upper roll 136 are supported so as to be rotatable about horizontal rotary axes W1 and W2 which are parallel to each other. The upper roll 136 can be pressed by means of a contact pressure device 138, for example a hydraulic piston/cylinder unit, against the saw blade 10 which is supported by the lower roll 134. The pivot axis J intersects both rotary axes W1 and W2 at approximately right angles and extends through those points where the rolls 134 and 136 contact the saw blade 10. In order to drive the rolls 134 and 136, the rolling station 26 is provided with a motor 140. An actuator 142, for example a servo motor, is also associated with the rolling station 26, by means of which the roll frame 132 can be swivelled about the vertical axis J and be brought from a central position in which the rolls 134 and 136 run in the longitudinal direction of the machine table 11 into a controlled slanted position so that the blade back 14 runs within a given tolerance range along the third of the three measuring stations 28 assigned to it. To this end, it is generally sufficient to swivel the roll frame by less than 1° from its central position to the one or the other side. The maximum swivel range is preventively set to 3° in either side, i.e. amounts to a total of 6°.

Of the three measuring stations 28 which are assigned to the blade back 14, the first one is arranged at the start, the second one is arranged near the centre and the third one near the end of the machine table 16. The three measuring stations 28 are identical; one of them is shown in FIG. 12 as a horizontal section. It has a supporting beam 144 which is fastened at the machine table 16 and movably guides a horizontal transverse rod 146 along its axis K. A measuring slide 148 is supported at the rod 146 in the manner of a balance beam, but pivotable about a vertical axis L. Two biased springs 150 attempt to hold the measuring slide 148 in a standard position in parallel to the longitudinal direction of the machine table 16 (FIG. 12). The two springs 150 bear against the supporting beam 144 and are each guided on one bolt 152 which is screwed into it. A distance sensor 154 is fastened at the supporting beam 144, which continuously measures the position of a plate 156 which is fastened at the rod 146 and thus the position of the measuring slide 148.

A sensor 158 (FIG. 1) is further fastened at the machine table 16, which emits a signal if a marking on the saw blade 10, for example a dash applied with a felt-tip marker, travels past it. All signals emitted from the measuring station 22 by the sensors 106 and 114, as well as the signals emitted by the three measuring stations 28 and the sensor 158 are supplied to a central computing and controlling unit 160. The same applies to signals which indicate the position of the actuator 142 and the revolutions of the rolls 134 and 136.

In addition to the guide rolls 20 which are supported on both frames 18, another guide roll 20 is supported on either side of the rolling station 26 below the holding-down devices 56 and 58 which are arranged there. All guide rolls 20 are essentially identical; according to FIGS. 13 and 14 each of them has an axle shaft 162 which is of a tubular shape in the illustrated example and is supported at either end by means of a roller bearing 164 each on an axle journal 166 each. The axle journals 166 have a square section at their axial outer end so that they are secured against rotation when they are accommodated in complementary mountings 168 (FIGS. 3, 5 and 6) at the machine table 16 or one of the frames 18.

The length of the axle shafts 162 is slightly larger than the width of the largest saw blade 10 to be processed in the machine. in order to prevent the teeth 12, which are generally set or provided with carbide tips or the like, from contacting the axle shaft 162 and to ensure that the saw blade 10 travelling over such an axle shaft 162 is sufficiently supported, two or more annular rollers 170 are arranged on each axle shaft 162, which preferably consist of plastic material or hardened steel and which have a cylindrical surface whose diameter is larger than that of the axle shaft 162. At least one of the annular rollers 170 arranged on the axle shaft 162 is axially adjustable so that it can be arranged in an area where it supports the saw blade 10 in the vicinity of the teeth 12 without contacting same.

Figure 13:
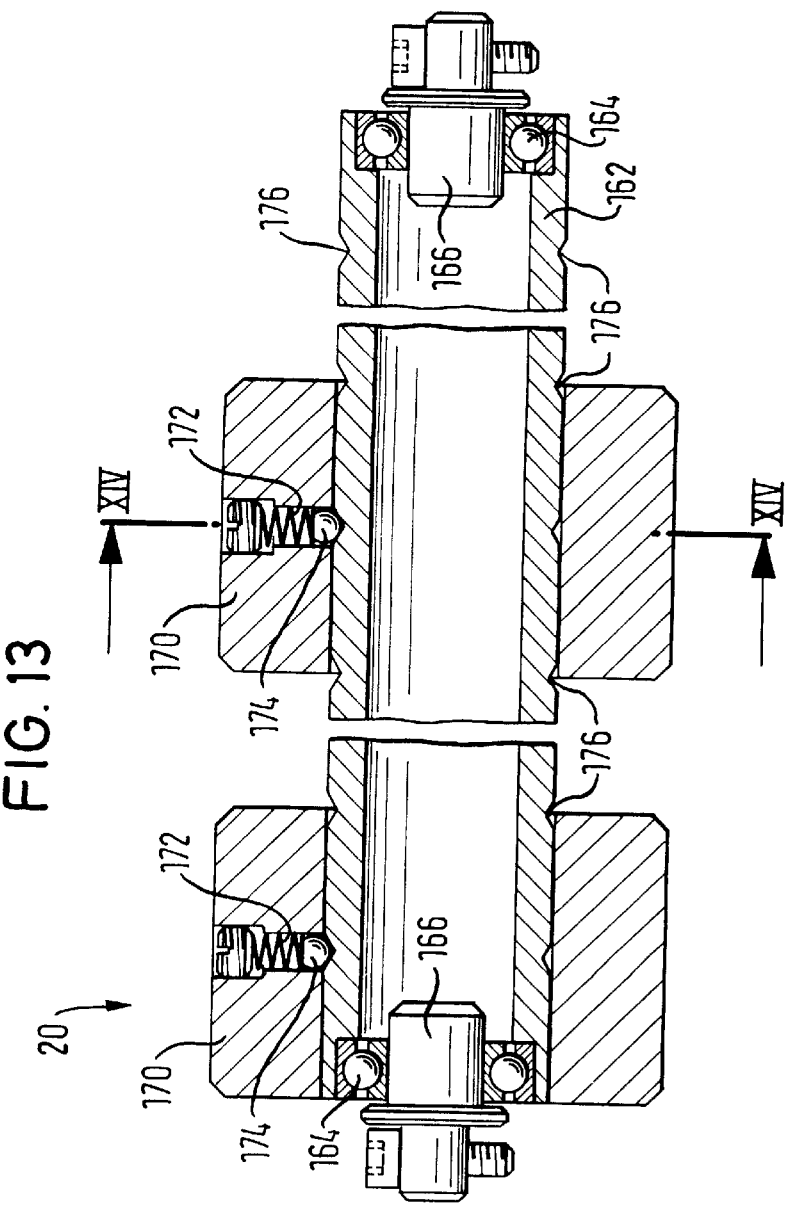
FIG. 13 shows another assembly from FIG. 6, also as an enlarged horizontal section.

According to FIG. 13 both rollers 170 shown therein are axially adjustable but secured against an unintentional axial adjustment in that they contain a spring 172 in each radial hole which forces a detent body 174 radially inwards into an annular groove 176 of the axle shaft 162. In the illustrated example balls are provided as the detent bodies 174, and the annular grooves 176 have a Vee-shaped cross-section. In this manner, each roller 170 can optionally be located in one of several positions which are established by the arrangement of the annular grooves 176. The number and spacing of the annular grooves 176 are selected in such a way that a sufficiently fine-step adjustment of the rollers 170 is possible.

When a saw blade 10 travels over the rollers 170, these will be caused to rotate and, due to friction, to drive the associated axle shaft 162 which in turn is smoothly supported by the roller bearings 164 on the associated axle journals 166. In the event that it is necessary to prevent an unintentional relative rotation between the rollers 170 and the axle shaft 162 and the thereby occurring wear of the detent bodies 174 and the annular grooves 176, an axis parallel longitudinal groove 178 could be machined in the axle shaft 162. At the points of intersection-between the longitudinal groove 178 and the annular grooves 176 indentations will be formed into which the detent bodies 174 can enter to a greater depth than would occur in the case of mere engagement with one of the annular grooves 176. In this manner, the rollers 170 of the illustrated example are secured against both a relative rotation and an axial displacement with respect to the associated axle shaft 162. Nevertheless, the rollers 170 can be released from their engagement by a moderate, externally applied force and reengaged in any other annular groove 176.

The operation of the illustrated machine is as follows:

a) For any levelling operation to be carried out and the preceding measurements it is required to move the saw blade 10 in the direction of the arrow A—if necessary alternatingly in the opposite direction, too—and to guide it in a straight movement, i.e. to prevent or to at least minimize a slanted travel. This is achieved by the inventive design of the rolling station 26, the rolls 134 and 136 of which being invariably responsible for the advance movement of the saw blade 10 although they are pressed by the contact pressure device 138 against the saw blade 10 only at a moderate force below the deformation limit particularly during measuring and elimination of bulges and dents in the saw blade. The straight movement of the saw blade 10 is monitored by one of the measuring stations 28 along which the blade back 14 travels.

In order to monitor the straight movement, the measuring station of the three measuring stations 28 which is arranged farthest to the right in FIGS. 1 to 6 is used, while the measuring station 28 arranged farthest to the left can be considered in this context as a fixed point for the position of the blade back 14. With respect to the straight movement of the saw blade 10 it is therefore the movements of the measuring slide 148, which is associated with the right measuring station 28 and abuts the blade back 14, which are of interest. If the blade back 14 deviates from its specified position in the area of the right measuring station 28 this will result in an axial displacement of the rod 146 together with the plate 156, which in turn causes the sensor 154 to emit signals corresponding to the magnitude and direction of the positional deviation of the saw blade 10. The control unit 160 processes these signals—and, if desired, also the signals emitted from the remaining two measuring stations 28—to become control commands for the actuator 142 which then swivels the roll frame 132 of the rolling station 26 about the vertical pivot axis J in either direction according to the double arrow M in FIG. 2.

This means that the rolls 134 and 136 are slanted with respect to the standard direction of travel A and thereby move the saw blade 10 depending on the magnitude and direction of its determined positional deviation to a greater or lesser extent towards the right measuring station 28 (FIGS. 1 to 5) or away from it. The actuator 142 will return the rolls 134 and 136 to their straight position no later than after the positional deviation of the saw blade 10 in the right measuring station 28 has been eliminated. In order to enable an earlier response, signals from the centre station 28, which is arranged between the measuring station 22 and the levelling station 24, can additionally be used.

b) In order to detect bulges and dents in the saw blade 10 while it performs several cycles in the sense of the arrow A the measuring slide 94 is stepped through different positions in which the sensor 106 measures the saw blade 10 via several parallel tracks as usual. The measuring values thus obtained will be tabulated with information concerning the travel covered by the saw blade 10 and serve to control the levelling station 24 with respect to the position and magnitude of the impact of its rolls 120 and 122 upon the saw blade 10 in the usual manner.

According to the invention the measuring station 22 in conjunction with the holding-down devices 36 and 46, which are adjustable according to width and thickness of the saw blade 10 and symmetrically with the measuring plane B, has the additional task of measuring the stress profile of the saw blade 10. For this purpose, a voltage is applied to the electro-magnet 112 so that it swivels the sensor 106 to clear the saw blade 10; the recording of the stress profile of the saw blade 10 is the exclusive responsibility of the sensor 114. The stress profile is made measurable according to an aspect of the invention which is independent of (a) by operating the supporting means 48. For this purpose, the lifting device 88 is advanced which lifts the supporting roll 86 by a distance which is predetermined by the setting of the stroke limiter 90. The saw blade 10 which is restrained to the blade supports 32 and 42 by the two holding-down devices 36 and 46 at equal distances on either side of the measuring plane B, i.e. which is prevented from lifting, is provided with a profile in the measuring plane B in that it is lifted by the supporting roller 86 in its centre, which depends on the magnitude and distribution of the internal stresses in the saw blade 10. This profile is measured by the sensor 114 at several cross-sections distributed over the length of the saw blade 10 by moving the measuring slide 94 transversely over it upon standstill of the saw blade 10.

In accordance with the measuring results the saw blade 10 can then be processed in a usual manner in the rolling station 26 during the subsequent cycles which are carried out at a generally constant speed, with the rolls 134 and 136 which are loaded by the contact pressure device 138 acting deformingly on the saw blade through the required number of adjacent passes.

c) The way and the magnitude of the required impact of the rolling station 26 on the saw blade 10 are also dependent on the shape of the blade back 14. Under saw mill operating conditions the saw blade 10 is subjected to greater expansion in the area of the teeth due to the cutting forces acting on the teeth 12 than in the area of the blade back 14; this must therefore be expanded during levelling so that the saw blade in the area of the teeth 12 is again subjected to an increased tensile stress when it is employed again in a sawing machine so that it does not wobble. A saw blade 10 travelling over the machine table 16 which has a concave blade back 14 therefore generally indicates that deforming influences of the rolling station 26, primarily in the vicinity of the blade back 14, are required. In order to be able to determine the location and intensity of the influence required to level the saw blade 10, the curvature of the blade back 14 has to be measured. This is generally done by those with skill in the art in that a straight edge is applied to the blade back 14 and the type of the required deformation of the saw blade is derived from the location and size of the light gap generated as a result.

According to the invention this task is, however, assigned to the three measuring stations 28, whose signals are commonly evaluated for this purpose by taking the positions of the three measuring slides 148 which are in contact with the blade back 14 at given distances from one another as coordinates of three measuring points lying on a circle. The three measuring points have fixed distances from each other in the direction of travel A of the saw blade 10. Their coordinates in this direction are therefore fixed; only the coordinates measured perpendicularly to the direction of travel A of the saw blade 10 in its horizontal plane are variable. On the basis of these measurements, the computing and controlling unit 160 continuously determines the radius of curvature of the blade back 14 during one cycle of the saw blade 10 and it determines simultaneously the required adjustment of the actuator 142 for the straight movement of the saw blade 10. This is an independent aspect of the invention which does not depend on the utilization of at least one measuring station 28 for ensuring the straight movement of the saw blade 10 as described under (a) and all the more so on the measurement of the stress profile described under (b).

d) If a wider saw blade is to be measured and/or levelled instead of the illustrated saw blade 10, the front blade support 42 and the front holding-down devices 46 and 58 will correspondingly be adjusted in a forward direction and, analogously, the front rollers 170 will be adjusted in a forward direction so that the saw blade which is to be processed now will again be supported, guided and held down in the required manner so that the machine components involved will not contact the teeth 12. The supporting, guiding and holding-down functions in the vicinity of the blade back 14 remain unchanged. The adjustability of the distance of the holding-down devices 36 and 46 from the measuring plane B is another independent aspect of the invention in conjunction with the described sensing of the stress profile by the measuring station 22. The described adjustability and engagement of the rollers 170 is also considered to be an independent invention.

We claim:

1. A method of measuring and correcting the stress profile of an elongated saw blade (10), in particular for band saws, wherein
   the saw blade (10) is moved through a measuring path and a rolling path in a direction of travel (A) which essentially corresponds to its longitudinal direction; said measuring path having a start area and an end area and a central area in between said start and end areas;
   two lateral edge regions of the saw blade (10) are supported on the measuring path and held down by holding-down forces in said start area and said end area of same;
   the profile of the saw blade (10) is measured in said central area of the measuring path in a measuring plane (B) which is orthogonal to its direction of travel (A);
   data of the profile height relative to a chord which extends transversely to the direction of travel (A), coordinated with data of the distance of the measuring points from an edge (14) of the saw blade (10) and data of the path of longitudinal movement of the saw blade is stored; and
   the saw blade (10) is rolled in said rolling path in a region-by-region manner in said direction of travel (A) in accordance with this data, wherein
      said lateral edge regions of the saw blade (10) are retained in the start area and the end area of the measuring path in a common reference plane which includes the direction of travel (A) of said saw blade (10);
      the saw blade (10) is lifted above the reference plane by a supporting force which is exerted only in the central area of the measuring path;
      the stress profile developed in this manner is measured; and
      alternately with measuring and correcting of the stress profile, bulges and dents of the saw blade (10) are measured in the same measuring plane (B) and said supporting force is removed for this purpose and the saw blade (10) is moved over the entire length of the measuring path so as to be flat in the reference plane.

2. The method of claim 1 wherein said supporting force is exerted in the measuring plane (B) only.

3. The method of claim 1 wherein said supporting force is exerted only at a distance from the two marginal regions.

4. A method of measuring and correcting the stress profile of an elongated saw blade (10), in particular for band saws, wherein
   the saw blade (10) is moved through a measuring path and a rolling path in a direction of travel (A) which essentially corresponds to its longitudinal direction;
   the profile of the saw blade (10) is measured in a measuring plane (B) which is orthogonal to its direction of travel (A);
   data of the profile height relative to a chord which extends transversely to the direction of travel (A), coordinated with data of the distance of the measuring points from an edge (14) of the saw blade (10) and data of the path of the longitudinal movement of the saw blade is stored;
   said edge (14) of the saw blade (10) is sensed in the plane of the saw blade orthogonally to said direction of travel (A) in order to obtain data concerning the curvatures of this edge;
   wherein the saw blade (10) is rolled under an angle of up to 3° in a slanted direction relative to its longitudinal direction in the rolling path in a region-by-region manner in the direction of travel according to all this data, and
   the deviations of the saw blade (10) from a given position as detected at said edge (14) are corrected by rolling the saw blade in accordance with these deviations in a direction slanted relative to its longitudinal direction.

5. The method of claim 1 wherein said holding-down forces are exerted only on the marginal regions in variable, identical distances upstream and downstream the measuring plane (B) according to the width and thickness of the saw blade (10).

6. The method of claim 4 wherein said edge (14) of the saw blade (10) is sensed at three places spaced in its direction of travel (A).

7. An apparatus for measuring and correcting the stress profile of an elongated saw blade, in particular for band saws, comprising
   a machine table (16) on which an elongated saw blade (10), in particular for a band saw, is movable in a direction (A) which essentially corresponds to its longitudinal direction;
   a measuring station (22) arranged at the machine table (16), said measuring station comprising
      a measuring plane (B) which extends orthogonally to the direction of travel (A) and in which at least one sensor (106, 114) is arranged;
   one pair of parallel blade supports (32, 42) for one lateral edge region each of the saw blade (10); and
   two pairs of holding-down devices (36, 46) which are arranged in a start and an end zone, respectively, of the measuring station (22) for pressing the saw blade (10) onto the blade supports (32, 42),
      wherein the blade supports (32, 42) lie in a common reference plane,
      a supporting means (48) is arranged in the measuring plane (B), which is movable from a rest position where it does not project beyond the measuring plane (B) into a supporting position where it lifts the saw blade (10), and is adjustable transversely to the direction of travel (A) of the saw blade (10); and
      for the purpose of adapting to saw blades (10) of different widths
         one of the blade supports (42) is adjustable away from or towards the other blade support (32);
         one holding-down device (46) of each pair of holding-down devices (36, 46) is adjustable relative to the other holding-down device (36) in the same manner as the associated blade support (42); and the supporting means (48) is connected with the adjustable blade support (42) and the adjustable holding-down devices (46) via a transmission (50–54) which adjusts the supporting means (48) upon the adjustment of the blade support (42) and the holding-down devices (48) by a certain distance in the same direction, but by half the distance.

8. The apparatus of claim 7 wherein the supporting means (48) is adjustable transversely to the direction of travel (A) of the saw blade (10).

9. The apparatus according to claim 7 wherein the supporting means (48) comprises a supporting roller (86) which abuts approximately in the center of the bottom of the saw blade (10).

10. In an apparatus for measuring and correcting the stress profile of an elongated saw blade having a roller track on which an elongated saw blade (10), in particular for a band saw, is movable in a direction (A) which essentially corresponds to its longitudinal direction, the improvement comprising axle shafts (162) which are rotatably supported and which extend over the entire width of the roller track and carry axially adjustable annular rollers (170) which by means of biased detent bodies (174) engage grooves (176, 178) of the associated axle shaft (162) and are thus retained in a selected axial position each and connected for a common rotation with the axle shaft (162).

\* \* \* \* \*

UNITED STATES PATENT AND TRADEMARK OFFICE
CERTIFICATE OF CORRECTION

PATENT NO. : 5,908,989
DATED : June 1, 1999
INVENTOR(S) : Ernst Beck et al.

It is certified that error appears in the above-indentified patent and that said Letters Patent is hereby corrected as shown below:

In column 2, line 45, please change "DE-A-42 14 744" to --DE-A-42 14 784--.

In column 2, line 53, please change "My" to --by--.

In column 2, line 62, please change "(if" to --of--.

In column 8, line 19, please change "in" to --In--.

Signed and Sealed this

Twenty-third Day of November, 1999

Attest:

Q. TODD DICKINSON

*Attesting Officer*     *Acting Commissioner of Patents and Trademarks*